April 27, 1954
F. L. MALTBY ET AL
2,677,095
SYNCHRONOUS INVERTER APPARATUS
Filed Feb. 21, 1949
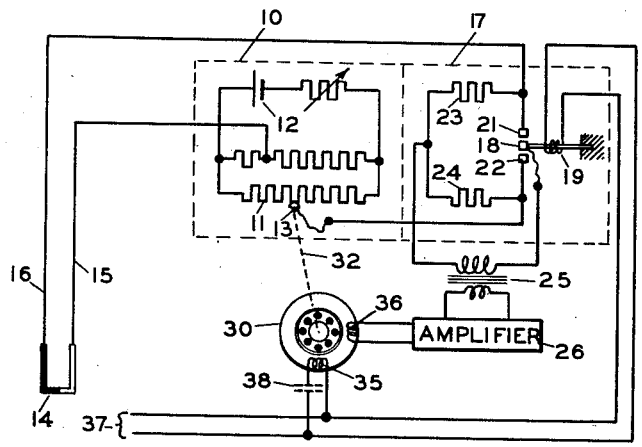
INVENTORS
Frederick L. Maltby
Joseph B. Kelley
BY
E. C. Sanborn
Attorney Patented Apr. 27, 1954

2,677,095

UNITED STATES PATENT OFFICE 2,677,095

SYNCHRONOUS INVERTER APPARATUS

Frederick L. Maltby, Middlebury, and Joseph B. Kelley, Thomaston, Conn., assignors to The Bristol Company, Waterbury, Conn., a corporation of Connecticut Application February 21, 1949, Serial No. 77,484

15 Claims. (Cl. 321—49)

This invention relates to means for detecting small unidirectional potentials and producing therefrom alternating potentials of proportional magnitude and of phase position dependent upon the polarity of said unidirectional potentials. In direct-current measuring networks such as potentiometers and bridges it is sometimes customary to determine unbalance conditions by the expedient of interrupting, commutating or "chopping" the potential to be detected, and thereby rendering it suitable to amplification by means of an electronic network, usually including one or more transformers. The output of such a transformer-amplifier combination may then be utilized in a suitable alternating-current motor for rebalancing the network, or otherwise reducing to zero the potential applied to the detector.

In the co-pending application Serial No. 53,077, filed by F. L. Maltby October 6, 1948, apparatus is disclosed for eliminating from a detector of the above nature errors due to contact potentials and to lack of uniformity in certain elements wherein a symmetrical structure is difficult to obtain. The present invention provides means to render symmetrical the operation of the vibrator or other interrupting device embodied in the system. Where non-uniform operation exists to the extent that contact is made on one side of the circuit for a longer time than on the other side, the result may appear as imperfect elimination of alternating potentials picked up by the detector circuit, resulting in a false balance and a corresponding error of measurement.

Where an interrupter or commutator intended for the purpose of "inverting" a direct-current possesses a unilateral characteristic of any kind, this lack of symmetry will be reflected in the alternating output as a bias or a direct-current component. If the input to such an interrupter contains an alternating component of the same frequency as that of the switching action, a unilateral characteristic will result in the transmission of the alternating-current component through the interrupter, so that there will appear in the output potential an alternating component having the same frequency, and depending in its magnitude upon its phase relation to that of operating of the switching device, and also upon the degree of symmetry characterizing that operation. Since such an inverter is commonly used for control of a servomotor in a self-balancing electrical system, with the object of reducing the unbalance unidirectional potential to zero, it follows that the presence of an alternating component due to imperfect inversion of the unidirectional input will tend to falsify the balance condition of the network and thus to introduce an error in measurement.

The degree of asymmetry may be expressed as a percentage of the cycle as $$"A" = \frac{D_1 - D_2}{2\pi} \times 100$$

where $D_1$ and $D_2$ designate the dwell intervals of the respective contacts, expressed as radians of the cycle of operation. Ideal performance is represented by reduction of the factor "A" to zero, corresponding to perfect symmetry of contact operation and resultant inversion.

Tests have shown that, whereas in the vibrating inverters represented in the prior art, the factor "A" cannot be consistently maintained at a value less than 4% to 5%, the inherent performance of devices embodying the principles of the present invention gives this factor a value of the order of $\frac{1}{10}$ of 1%.

In the case of a complex wave consisting of a component of fundamental frequency with odd harmonics only, the positive and the negative half-waves will be symmetrical about the zero line of said wave, with the result that uniform time spacing will characterize the instants when the increasing and the decreasing magnitudes pass through the zero value. Thus, if switching action is effected at these instants, their time-spacing will be uniform, and the desired isochronous performance will be obtained. As an alternative, where a symmetrical wave is involved, a substantially uniform time spacing will be obtained by causing the switching action to take place at a point in the wave when its magnitude first attains a predetermined definite value (without respect to polarity) after passing through the zero point. The first alternative is, of course, a special case of the second; but if the value attained after each transition through the zero point is made sufficiently small, the performance will be the full equivalent of that characterizing true "zero-point" switching.

It is an object of the present invention to provide an oscillating inverter adapted to the periodic switching of currents containing components characterized by complex wave-forms and wherein the switching action shall be truly synchronous with an energizing current, and isochronous in its timing.

It is a further object to provide an inverter which shall inherently tend to perform its switching function at a zero point of an energizing current, or at a predetermined and definite small departure therefrom.

It is a further object to provide a device of the above nature which shall be substantially insensitive to relatively large variations in the operating voltage or frequency.

It is a further object to provide a device of the above nature whose operation shall be unaffected by position or by accelerations associated with sudden mechanical movement.

It is a further object to provide a device of the above nature which shall be free from the need for critical adjustments.

In carrying out the purposes of the invention, it is proposed to utilize a synchronous contactor of the oscillating type, but to depart radically from certain conventional practices now customary where such devices are used. In oscillating contactors of the prior art it has been customary to employ the principle of mechanical resonance, the oscillating element having considerable mass, which in combination with its resilient characteristics, provides means for tuning to a frequency substantially that, or near that, of operation, whereby said element, functioning as a reed, will tend to vibrate at a predetermined frequency. In the present invention the oscillating element is constructed to have a minimum of inertia, and to be subject only to forced oscillation due to magnetic impulses derived from suitable exciting means. This oscillator is substantially aperiodic, in that its natural period is not of the same order as its operating frequency, and, while of little significance, is in general very much higher than that of the performance of the apparatus. The operation of the oscillating contactor which forms the basis of the present invention involves an extremely rapid transition from one to the other of its extreme positions, so that, for a large proportion of the total operating time, the movable element is at rest at one or other of those positions.

In obtaining the required performance of an aperiodic oscillator, it is proposed to combine the influences of two alternating magnetic forces derived from currents having a common frequency but materially differing in time-phase characteristic, and acting at different points on the oscillating member, whereby the stress developed by one of said forces and tending to throw the member from one to the other of its extreme positions will for a large part of each cycle of operation be opposed and overcome by the stress due to the other forces tending to hold the member in its deflected position, releasing the same only at, or near, the instant when said holding stress passes through its zero value. Specifically, the magnetic force derived from one of said alternating currents is exerted on a polarized portion of the oscillating reed, whereby to exert its influence synchronously with the operating frequency; and the force derived from the other of said currents is exerted by means of small electromagnets on either side of said reed, acting upon a non-polarized portion thereof as an armature, whereby, upon its initial deflection, the reed will be attracted and held to its deflected position substantially throughout the duration of the half-cycle of current, and without respect to the direction in which said current is flowing. By suitably adjusting the phase relation of the two currents there may be obtained such an action that, while the polarized portion of the oscillating element is being stressed for deflection in a certain sense, the electromagnetic effect on the non-polarized portion will be such as to prevent movement of the oscillating element in response to said stress, until the current in the electromagnet passes through a zero value, at which time, under the influence of the driving stress, the reed will abruptly swing from one to the other of its extreme positions, where it will again be subject to a retaining force derived from the electromagnetic system, and will be constrained to remain in that position until the holding current again passes through a zero value.

Other features and advantages of the invention will be hereinafter described and claimed.

In the drawings:

Fig. 1 is a diagram of a measuring system, wherein the invention may advantageously be substituted for devices of the prior art.

Fig. 2 is a representation of an oscillating contactor embodying the principles of the invention.

Fig. 3 is a graphic representation of certain alternating electrical magnitudes associated with the performance of the apparatus shown in Fig. 2.

Fig. 4 is a diagram showing how the invention may be substituted for the corresponding device in Fig. 1.

Fig. 5 is a diagram of an alternative application of the invention.

Referring now to the drawings:

Fig. 1 is a diagram of a conventional measuring system adapted to the utilization of a synchronous switching device either as found in the prior art, or as embodied in the present invention; and the hereinbefore stated objects of the invention may be said to be comprehended in its obvious merit when compared with earlier devices for performing an equivalent function. In Fig. 1, the numeral 10 indicates generally a potentiometer network including a slide wire 11 adapted for energization from a constant potential battery or equivalent source 12, and having a movable contact 13 adapted to cooperate with said slide wire in establishing balance of the potentiometer network. A source of electromotive force whose magnitude is to be measured is represented by a thermocouple 14 having extension leads 15 and 16 connected between the contact 13 and a further selected point in the potentiometer network in series with a detector network 17. The latter network includes a synchronous inverter for the purpose of deriving from the unidirectional unbalance potential of the network 10 a representative alternating potential which may be amplified and applied in the control of a conventional servomotor for rebalancing the network. The inverter, as shown in Fig. 1, is of the type set forth in said copending Maltby application Serial No. 53,077, and includes a movable contact 18 actuated by a winding 19 in cooperation with a permanent magnet not shown, and adapted to cooperate with stationary contacts 21 and 22 as a single-pole double-throw switch, the latter contacts being connected by two equal resistors 23 and 24 in series. The junction point of the contact 21 with the resistor 23 and the junction point of the contact 22 with the resistor 24 are connected to leads whereby said auxiliary network is placed in series with the thermocouple circuit and the potentiometer network. The moving contact 18 and the junction point of the resistors 23 and 24 are connected to the primary terminals of a suitable isolating and voltage-adjusting transformer 25, whose secondary terminals are connected to an amplifier 26. An induction motor 30 is provided with a rotor 31 having mechanical connecting means 32 to the movable contact 18 whereby to position the latter with respect to the slide wire 11. Said motor is provided with two mutually displaced stator windings 35 and 36, of which the former is adapted for energization from a constant frequency alternating-current source 37 and the latter is connected to the output terminals of the amplifier 26. The winding 35 may have connected in circuit therewith a capacitor 38 or other phase shifting device, whereby, according to principles well-known in the art, to obtain optimum performance of the motor; or, alternatively, the desired phase-shift characteristic may be introduced by suitable elements incorporated in the circuits of the amplifier 26. The winding 19 is connected to the source 37, whereby operation of the contacting elements will be made synchronous with excitation of the winding 35 in the motor 30.

While, beyond features characterizing performance of the present invention as presently to be pointed out, no novelty is claimed for the measuring system to which it may be applied, the operation of said systems as shown in Fig. 1 will be briefly set forth. Under a condition of balance in the potentiometer network 10, the unidirectional potential derived from said network and applied to the inverter will have a zero value, with the result that there will be no alternating voltage due to that source applied to the transformer 25, and thereby to the winding 36 in the motor 30. Said motor will consequently not be subject to any driving influence, and the contact 13 will remain in its position on the slide wire 11. Assuming a change of potential in the potentiometer network, as would result from a change in the temperature to which the thermocouple 14 is exposed, the potentiometer network will no longer be balanced and unidirectional potential will be applied to the detector network including the synchronous inverter. A corresponding alternating potential will appear in the output of said inverter, and after being suitably amplified in the amplifier 26 will be impressed upon the winding 36 of the motor 30. Said motor will thus be caused to operate, and will translate the contact 13 along the slide wire 11. By suitably selecting, proportioning and interrelating the elements of the system, the displacement of the contact 13 may be made to have a direction and magnitude such as to reduce to zero the total unidirectional potential output of the potentiometer, thus restoring the position of balance. The position of the contact 13 with respect to the slide wire 11 thus becomes a measure of the unidirectional potential derived from the thermocouple 14.

Since, in practice, the thermocouple 14 may be located a considerable distance from the remainder of the measuring system, the two conductors 15 and 16 by which it is connected to the network may be exposed to inductive influences from neighboring alternating current conductors or magnetic fields, or to leakage from nearby circuits. Such effects are commonly known as "pick-up," and their presence has been highly detrimental to the performance of measuring systems involving synchronous inversion of potentiometer unbalance conditions. According to the principles hereinafter to be set forth, the peculiar operation of the synchronous device covered by the present invention is such as to minimize, and in general reduce to a negligible magnitude, the effect of such parasitic potentials.

Referring now to Fig. 2 of the drawings; the numeral 40 designates a base plate having mounted thereon a permanent magnet member 41 fitted with mutually opposed pole pieces providing therebetween an air gap to be traversed by the flux of the magnet. Secured to, and supported by, the yoke portion of the magnet 41 is a ferromagnetic core 42 having insulatedly fixed to its free extremity a resilient spring or reed 43 formed of steel or other magnetic material, free to oscillate in the air gap of the magnet 41 and having a portion extending beyond said gap to be substantially free of the magnetic influence of the magnet 41. Surrounding the core 42 is a winding 44 adapted to be energized from a suitable alternating-current source, whereby said core 42, and the reed 43, will be subjected to alternating magnetic excitation, which, according to well-known principles, in coaction with the polarizing influence of the permanent magnet 41, will cause the reed 43 to be oscillated in the gap of the magnet 41 at a frequency corresponding to that of said source.

Exterior to the gap in the magnet 41, and adapted to coact with the extended and non-polarized portion of the reed 43 as an armature, is a pair of small electromagnets 45 and 46 having a common electrical winding 47 adapted for energization from a suitable alternating-current source. Carried by the extremity of the reed 43 is a double-faced contact 48 adapted to be moved through a limited distance by oscillation of said reed. Adjustably secured in posts 49 and 50 insulatedly mounted upon the base plate 40 are adjustable stationary contacts 51 and 52 juxtaposed to the respective faces of the contact 48 and so positioned as to be alternately engaged by said contact 48 as it moves with the reed 43.

The proportioning and the mechanical adjustment of the several elements of the apparatus are made such that the contacts 51 and 52 in coaction with the double faced contact 48 will act as stops to limit the deflection of the reed 43. The electromagnets 45 and 46 are so positioned with respect to the reed that with the latter in either of its extreme positions as limited by the contacting stops, the air gap of the electromagnet most closely approached by the reed 43 will be materially shorter than that of the more remote electromagnet, but will not be completely closed. Thus, with the reed in either of its extreme positions and the electromagnets 45 and 46 equally excited, the magnet most closely approached by the reed will tend to restrain said reed from further deflection and will not release it until the flux in that magnet has been reduced to substantially a zero magnitude.

The winding 42 on the core 44 and the winding 47 on the electro-magnets 45 and 46 are connected to a common alternating current source, but in such a manner that the currents in said windings will maintain a substantially quadrature relationship. This may be effected by any one of a number of well-known methods. For example, a parallel connection may be used, and the winding 44 made highly inductive and the winding 47 of relatively low inductance, which in itself would tend to establish a large phase difference between the currents flowing in the respective windings. If desired, the inductance of the portion of the circuit including the winding 44 may be increased by placing in series therewith a suitable inductor 56, while the phase of the current in that portion of the circuit which includes the winding 47 may be modified by placing in series therewith a capacitor 57. By suitably proportioning said inductor and capacitor to the other impedance components of the respective circuit branches, the desired quadrature phase relationship between the currents in said branches may readily be established and maintained. Because of the desirability of the precisely maintained phase relationship between the output of the vibrator and the exciting voltage applied to the winding 35 of the motor 30, it is desirable that the time-constant of the branch of the network including the winding 47 be not subject to variation under external influences. With this in view, both the resistance of that branch and the value of the capacitor 57 should be substantially constant under all operating conditions.

The movable contact 48 is connected by means of a flexible lead 58 to a terminal post 59 insulatedly mounted upon the base plate 40. The posts 49 and 50 are electrically connected to respective terminals 60 and 61 similarly mounted upon the base plate 40. There is thus provided electrical connection whereby the contacts 48, 51 and 52 may be associated with any desired external circuit. Direct connection of the contact 48 to the terminal 59 by means of the conductor 58 provides a path whereby it will be unnecessary for current to traverse the extent of the reed 43. This arrangement eliminates thermoelectric effects due to temperature differences at the extremities of said reed and also eliminates any tendency for electromotive forces induced in said reed by alternating magnetic fields to which it may be exposed to be picked up and superimposed upon the circuits of which the coacting contacts may form a part.

The action of the apparatus as set forth will be understood by reference to Fig. 3. The curves A and B in the upper portion of the diagram represent the currents in the windings 44 and 47 respectively, the former lagging the latter by substantially 90 electrical degrees; and the graph C in the lower portion represents the deflected positions of the reed 43 and its contact 48. All magnitudes are shown to a common set of time ordinates, $p, q, r, s, t,$ each representing a quarter-cycle of the basic frequency.

In examining the performance of the vibrator, consideration may first be given to conditions existing at an instant represented by the ordinate $p,$ when the current A in the winding 44 is passing through a zero value and the current B in the winding 47 is at a maximum. It may be assumed that the polarity of the winding 44 with respect to that of the magnet 41 is such that, when the current A is of negative polarity as shown in the diagram, it will tend to urge the reed toward the left as seen in Fig. 2 so that the contact 48 will engage the contact 51, and when the current A has a positive value or is above the zero line, the tendency will be for the reed 43 to urge toward the right, so that the contact 48 will engage the contact 52. At the instant indicated by the ordinate $p,$ the reed 43 will be resting in its right hand position as seen in Fig. 2 with contacts 48 and 52 in mutual engagement. The current A is passing through its zero value as it changes from positive to negative, and, as this current assumes a negative value, it will tend to deflect the reed toward the left. Because of the air-gap of the magnet 46 being relatively short in comparison with that of the magnet 45, the restraining force of the former magnet due to the current B flowing in the winding 47 will be so great that the deflecting force upon the reed 43 due to flux produced by the current in the winding 44 cooperating with that of the permanent magnet 41 will not be sufficient to overcome the magnet 46, and the reed 43 will be retained in its right-hand position. This condition will continue until the current B approaches its zero value at the instant indicated by the ordinate $q,$ whereupon the magnet 46 will be so weakened as to release the reed 43, which under the influence of the current A (then at its maximum negative amplitude) will abruptly translate to its left-hand position, as indicated by the graph C in the lower part of the diagram. The contact 48 will thus be released from engagement with the contact 52 and forced to engage the contact 51 with a snap action, in which position it will be retained, first by the joint influence of the magnets 41 and 45, and, as the current A in the winding 44 approaches a zero value, corresponding to the ordinate $r,$ will continue to be retained by the increasing force of the magnet 45 due to the current B flowing in the winding 47. Thus, as before, the moving element will be retained in its deflected position despite the increasing force of the current in the winding A tending to deflect it away from that position until the current B again approaches a zero value as indicated by the ordinate $s.$ As this zero value is approached the moving element, under the influence of the magnetic force due to the current A at its maximum positive value, will be abruptly deflected toward its right-hand position, performing a snap switch action similar to, but in reverse sense to, that hereinbefore described, and bringing the contacts 48 and 52 into mutual engagement as at the beginning of the cycle under consideration. There has thus been provided a vibrating double-throw contactor wherein the contacting elements are in engagement during a relatively large proportion of each half-cycle of operation, and wherein transition between positions is effected with a snap action substantially at the instant of the holding current passing through its zero value, without respect to the intermediate conditions.

It may be shown that, so long as the holding current B in the winding 47 is substantially free from even harmonics or any unidirectional component, the action will be truly isochronous, in that the current will pass through its zero values at exactly equal intervals of time. This condition is commonly met by the potentials derived from all commercial power systems. The action of the contactor is thus inherently synchronous and is substantially unaffected by relatively great changes in amplitude and wave form of the controlling current.

By so proportioning the mechanical parts of the device that the natural period of the moving element is far removed from the required frequency of operation (preferably, much higher), resonance effects are eliminated, introducing a "push-pull" action and a truly aperiodic characteristic. Furthermore, with the relative disposition of parts as shown, wherein the moving contact 48 partakes of the greatest motion of any part of the reed, the deflection of the reed is positively limited by contact engagement, with the consequent further minimizing of any tendency toward bouncing or chattering due to harmonic frequencies or mechanical resonance. The low mass of the reed 43, made possible by its aperiodic design, coupled with relatively great permissible stiffness, renders it substantially immune to the influence of gravity or other extraneous acceleration forces.

In Fig. 4 is indicated the manner in which the synchronous inverter described as embodying the principles of the invention would be substituted for that shown in Fig. 1. The contact members 18, 21 and 22 of the inverter shown in Fig. 1 are replaced by contact members 48, 51 and 52 of that shown in Fig. 2, the resistors 23 and 24 and other associated connections remaining unchanged. The winding 44 of the improved form of inverter is connected to the source 40; and the auxiliary windings 45 and 46 are connected through the phase-shifting capacitor 57 also to said source. Because of the timing of the switching action being subject to the electromagnets 45 and 46, rather than the winding 44, and the two electromagnetic systems being operated in a substantially quadrature phase relationship, substitution of the inverter embodying the invention for that shown in Fig. 1 may require certain phase adjustments in order to secure best performance in the balancing motor. This may be effected, either by shifting the phase positions of both currents in the operating winding of the inverter, while maintaining between them substantial quadrature relationship, or by adjustment of the capacitor 38 or other means whereby suitable phase-relationship between the currents in the motor winding is normally established and maintained. The principles of operation of the apparatus to maintain the potentiometer network in a state of balance are essentially the same as set forth in connection with the embodiment of Fig. 1, while the positive snap action of the contacting members, coupled with the extended dwell during each cycle, will, as hereinbefore set forth, materially enhance the sensitivity of response, efficiency of operation, and immunity to disturbing influences.

In Fig. 5 is shown a detector network wherein the principles of the present invention are especially advantageous. The potentiometer, transformer, amplifier and balancing motor may be in all respects identical to those shown in Fig. 1. The distinction between the modification shown in Fig. 5 and that shown in Fig. 4 lies in the fact that, while in Fig. 4 the contacts of the inverter are included in two branches of a bridge circuit which is completed by the resistors 23 and 24, in Fig. 5 two identical double-throw oscillating elements are used, thus providing four contact pairs, of which two replace the resistors 23 and 24.

Referring to Fig. 5, the contacts 48, 51 and 52 are identical with those shown in Fig. 4. A duplicate oscillator element embodies contacts 48', 51' and 52'. Contacts 51 and 51' are connected together and to one of the two conductors leading to the potentiometer network. Contacts 52 and 52' are similarly connected together and to the other conductor leading to the potentiometer network. Windings 44 and 47 associated with the first of the two oscillators are interconnected with coils 44' and 47' similarly associated with the second oscillator, the connections being such that the reeds carrying the contacts 48 and 48' will operate in exact synchronism and with such relative polarities that, as either of said moving contacts moves in one direction, the other will move in the opposite direction. In other words, when the moving contact 48 engages contact 51, the moving contact 48' engages contact 52'; and conversely when contact 48 engages contact 52, the contact 48' engages contact 51'. The oscillating inverter thus acts to connect the respective conductors from the potentiometer network alternately to the respective input terminals of the transformer 25, in this way constituting a true synchronous reversing switch or commutator, whereby substantially the whole of the power derived from the potentiometer circuit is commutated and applied to the primary of the transformer 25 to induce a proportional alternating electromotive force therein.

While no novelty is herein claimed for the practice of fully commutating the unidirectional output of the balanceable electrical network for the purpose of producing an amplified alternating equivalent thereof, the principle of the present invention is especially applicable to this purpose by virtue of the positive contact action characterizing the device, and of the fact that the contacting members are in engagement with one polarity or the other during a large proportion of the total cycle. The former characteristic makes for definite reversal, with no appreciable open-circuit, short-circuit, or erratic conditions, and the latter enables practically the whole of the power output of the network under measurement to be utilized in control of the balancing motor.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In a synchronous contactor, the combination of magnetomotive means for producing a substantially constant unidirectional magnetic field, a magnetizable member adapted for limited oscillation in said field, means for continuously subjecting a portion of said member to an alternating magnetizing force adapted to produce a field to cooperate with the first-mentioned field to cause said member to oscillate, a pair of electromagnets positioned on opposite sides of said member and adapted to cooperate therewith in its respective extreme positions to exert a restraining force thereon, means comprising a circuit continuously connected to said electromagnets for concurrently energizing said magnets to produce an alternating magnetizing force of the same frequency as, but substantially out-of-phase with, said first named magnetizing force, contact means carried by said member, and stationary contact means adapted to be engaged by said first named contact means with displacement of said member to its respective extreme positions.

2. In a synchronous contactor, a magnetizable member adapted for oscillatory displacement through a limited range, contact means carried by said member, stationary contact means adapted to be engaged by said first named contact means with displacement of said member to its respective extreme positions, means for producing a substantially constant unidirectional magnetic field comprising a magnet having poles defining an air gap and disposed with said air gap embracing said magnetizable member, a first electromagnet having its magnetic circuit including a portion of said magnetizable member and said air gap, whereby to deflect said magnetizable member toward one or other of said poles according to the direction of current in the winding of said electromagnet, second and third electromagnets so positioned on opposite sides of said magnetizable member that a portion of said member lies within the field of both said last-named electromagnets; whereby, upon equal excitation of said magnets said member will tend to be attracted toward the nearest of the same, leads for supplying alternating current to said first electromagnet, and means comprising a circuit continuously connected to said second and third electromagnets and to said leads for concurrently energizing said second and third electromagnets with alternating current in quadrature with the alternating current supplied to said first electromagnet.

3. In a synchronous contactor, a magnetizable member adapted for oscillatory displacement through a limited range, contact means carried by said member, stationary contact means adapted to be engaged by the first-mentioned contact means with displacement of said member to its respective extreme positions, means for subjecting said member to an alternating magnetic force tending to move said member alternately to said extreme positions, and electromagnetic means for subjecting said member to a second alternating magnetic force displaced in predetermined phase relation to said first force for holding said member in either of its extreme positions as said first force passes through its zero value and for releasing said member for movement to the other extreme position while said first force passes through a predetermined value, and circuit means continuously connected to said electromagnetic means for conducting alternating current thereto, said circuit means being entirely separate from the aforementioned contact means.

4. In a synchronous contactor, the combination of means for producing a substantially constant unidirectional magnetic field, a magnetizable member adapted for limited oscillation in said field, means for subjecting a portion of said member to an alternating magnetizing force adapted to produce a field to cooperate with the first-mentioned field to cause said member to oscillate, said member having a natural period of oscillation substantially different from that of said magnetizing force, electromagnetic means adapted to subject another portion of said member to an alternating magnetizing force of the same frequency as, but substantially out-of-phase with, said first named magnetizing force, contact means carried by said member, and stationary contact means adapted to be engaged by said first named contact means with displacement of said member to its respective extreme positions, and circuit means independent of both said contact means for continuously energizing said electromagnetic means.

5. In combination, a pair of conductors connectible to a source of direct current, a first pair of contacts, one of which is connected to one of said conductors and the other to the other of said conductors, a second pair of contacts, one of which is connected to the first of said conductors and the other to the other of said conductors, a first oscillator element carrying a contact movable alternately into engagement with the contacts of said first pair, a second oscillator element carrying a contact movable alternately into engagement with the contacts of said second pair, electromagnetic means connected to and alternating-current source of predetermined frequency for subjecting each of said elements to an alternating magnetizing force to oscillate said elements in synchronism at said frequency to engage the first mentioned movable contact with the first mentioned contact of said first pair concurrently with engagement of the second mentioned movable contact with the second mentioned contact of said second pair and to engage said first mentioned movable contact with the second contact of said first pair concurrently with engagement of said second mentioned movable contact with the first mentioned contact of said second pair, and a transformer including a primary winding, one terminal of said winding being connected to one of said movable contacts and the other terminal to the other of said movable contacts.

6. In the combination defined by claim 5, other electromagnetic means cooperating with said oscillator elements for subjecting each of the latter to an alternating magnetic force to restrain each oscillator element against movement from one to the other of the associated pair of contacts until a predetermined point in the cycle of the first mentioned alternating magnetizing force is attained.

7. In combination, a pair of conductors connectible to a source of direct current, two equal resistors having one terminal of each connected respectively to said conductors and the free terminals of each connected to a common conductor, a transformer having a primary winding with two terminals, one of which is connected to said common conductor, an oscillator element having a contact connected to the other of said primary terminals, means for subjecting said oscillator element to an alternating magnetizing force to urge said oscillator contact alternately into electrical engagement with said conductors at a predetermined frequency, and means for restraining said oscillator element against movement out of electrical engagement with either of said conductors until said magnetizing force attains a predetermined value.

8. In combination, a pair of conductors connectible to a source of direct current, two equal resistors having one terminal of each connected respectively to said conductors and the free terminals of each connected to a common conductor, a transformer having a primary winding with two terminals, one of which is connected to said common conductor, an oscillator element having a contact connected to the other of said primary terminals, means for subjecting said oscillator element to an alternating magnetizing force to urge said oscillator contact alternately into electrical engagement with said conductors at a predetermined frequency, and means for subjecting said oscillator element to a second alternating magnetizing force displaced in predetermined phase relation to the first force for holding said element against movement out of electrical engagement with either of said conductors until said first force attains a predetermined value.

9. In a synchronous contactor, a magnetizable member adapted for oscillatory displacement through a limited range, contact means carried by said member, stationary contact means adapted to be engaged by the first-mentioned contact means with displacement of said member to its respective extreme positions, means for subjecting a portion of said member to an alternating magnetic force tending to move said member alternately to said extreme positions, electromagnetic means cooperating with another portion of said member for applying thereto another alternating magnetizing force of the same frequency as said first-named magnetizing force, and a reactive device for shifting the phase of one of said magnetizing forces with respect to the other to a predetermined extent for enabling said second magnetizing force to hold said member in either of its extreme positions as said first force passes through its zero value and to release said member for movement to the other extreme position while said first force passes through a predetermined value, and circuit means independent of said contact means for continuously energizing said electromagnetic means.

10. In a synchronous contactor, the combination of means for producing a substantially constant unidirectional magnetic field, a magnetizable member adapted for limited oscillation in said field, means for subjecting a portion of said member to an alternating magnetizing force adapted to produce a field to cooperate with the first-mentioned field to cause said member to oscillate, said member having a natural period of oscillation substantially different from that of said magnetizing force, electromagnetic means adapted to subject another portion of said member to an alternating magnetizing force of the same frequency as said first named magnetizing force, a reactive device for shifting the phase of one of said magnetizing forces with respect to the other, contact means carried by said member, and stationary contact means adapted to be engaged by said first-named contact means with displacement of said member to its respective extreme positions, and circuit means entirely separate from said contact means for continuously energizing said electromagnetic means.

11. In a synchronous contactor, the combination of means for producing a substantially constant unidirectional magnetic field, a magnetizable member adapted for limited oscillation in said field, contact means carried by said member, stationary contact means adapted to be engaged by the first-mentioned contact means with displacement of said member to its respective extreme positions, a source of unrectified alternating current, electromagnetic means energized by said current for producing sinusoidal magnetomotive force, and means comprising said movable member for periodically varying the reluctance of the magnetic circuit including said member to cause a non-sinusoidal force to be applied to said member for moving the latter from one extreme position to the other at predetermined points in the cycles of said alternating current.

12. The method of operating a synchronous contactor comprising continuously subjecting a magnetizable element to an alternating magnetic force while said element is in a unidirectional magnetic field to cause said member to oscillate between two extreme positions, and concurrently and continuously applying to said element an alternating magnetizing force of the same frequency as, but substantially out-of-phase with, the first-mentioned magnetizing force to hold said member in its respective extreme positions against the action of said first-mentioned magnetizing force until the second-mentioned magnetizing force arrives substantially at zero values.

13. In a synchronous contactor, the combination of means for producing a substantially constant unidirectional magnetic field, a magnetizable member adapted for limited oscillation in said field, contact means carried by said member, stationary contact means adapted to be engaged by the first-mentioned contact means with displacement of said member to its respective extreme positions, electromagnetic means, means providing a source of unrectified alternating current and connected to said electromagnetic means independently of said contact means for continuously energizing said electromagnetic means to produce sinusoidal magnetomotive force, said magnetizable member being also positioned for oscillation in the field of said electromagnetic means, and means comprising said magnetizable member for periodically varying the reluctance of the magnetic circuit including said member and said electromagnetic means to cause a non-sinusoidal force to be applied to said member for moving the latter from one extreme position to the other at predetermined points in the cycles of said alternating current.

14. The method of operating a movable contact-carrying member into engagement with stationary contact means, said method comprising applying to said member a unidirectional magnetic field, applying to said member an alternating magnetic field to effect oscillation of said member, and modifying the effect of said alternating magnetic field upon said member through the reluctance of a magnetic path through said member for maintaining said member in contact-engaging positions throughout the major portions of the cycles of said alternating magnetic field and shifting said member from one contact-engaging position to another at predetermined points in said cycles.

15. In combination, a pair of conductors connectible to a source of direct current, a first pair of contacts, one of which is connected to one of said conductors and the other of which is connected to the other of said conductors, a second pair of contacts, one of which is connected to the first of said conductors and the other to the other of said conductors, oscillator means carrying contacts and including connections to a source of alternating-current of predetermined frequency for oscillating said contacts in synchronism at said frequency whereby one of said oscillator contacts is movable alternately into engagement with the respective contacts of said first pair and the other of said oscillator contacts is brought into engagement with the second mentioned contact of said second pair when the first oscillator contact engages the first-mentioned contact of said first pair and into engagement with the first-mentioned contact of said second pair when said first oscillator contact engages the second contact of said first pair, and a transformer including a primary winding, one terminal of said winding being connected to one of said oscillator contacts and the other terminal to the other of said oscillator contacts.

References Cited in the file of this patent

UNITED STATES PATENTS

| Number | Name | Date |
|---|---|---|
| 922,099 | Dean | May 18, 1909 |
| 1,307,517 | Rainey | June 24, 1919 |
| 2,286,846 | Garstang | June 16, 1942 |
| 2,322,597 | Short | June 22, 1943 |
| 2,329,224 | Short | Sept. 14, 1943 |
| 2,349,656 | Gulliksen | May 23, 1944 |
| 2,375,158 | Wills | May 1, 1945 |
| 2,387,616 | Schmidt | Oct. 23, 1945 |
| 2,390,182 | Schirrmelster | Dec. 4, 1945 |
| 2,423,524 | Side | July 8, 1947 |
| 2,489,656 | Mas | Nov. 29, 1949 |
| 2,515,771 | Hall | July 18, 1950 |
| 2,541,427 | Lee | Feb. 13, 1951 |